US012753302B2

(12) United States Patent
Ratnagiri

(10) Patent No.: US 12,753,302 B2
(45) **Date of Patent: *Oct. 6, 2026**

(54) POLYOXYMETHYLENE COMPOSITIONS

(71) Applicant: DELRIN USA, LLC, Wilmington, DE (US)

(72) Inventor: Ramabhadra Ratnagiri, Wilmington, DE (US)

(73) Assignee: DELRIN USA, LLC, Wilmington, DE (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/490,925

(22) Filed: Oct. 20, 2023

(65) Prior Publication Data

US 2025/0051562 A1 Feb. 13, 2025

Related U.S. Application Data

(63) Continuation of application No. 17/440,157, filed as application No. PCT/US2020/022698 on Mar. 13, 2020, now Pat. No. 11,827,779.

(60) Provisional application No. 62/817,689, filed on Mar. 13, 2019.

(51) Int. Cl.

| | |
|---|---|
| ***C08L 59/02*** | (2006.01) |
| ***C08F 120/56*** | (2006.01) |
| ***C08F 222/08*** | (2006.01) |
| ***C08G 8/08*** | (2006.01) |
| ***C08G 8/10*** | (2006.01) |
| ***C08L 33/26*** | (2006.01) |
| ***C08L 35/06*** | (2006.01) |

(52) U.S. Cl.

CPC ............... *C08L 59/02* (2013.01); *C08L 33/26* (2013.01); *C08L 35/06* (2013.01); *C08F 120/56* (2013.01); *C08F 222/08* (2013.01); *C08G 8/08* (2013.01); *C08G 8/10* (2013.01)

(58) Field of Classification Search

CPC .......... C08L 59/02; C08L 33/26; C08L 35/06; C08F 120/56; C08F 222/08; C08G 8/08; C08G 8/10

See application file for complete search history.

(56) References Cited

U.S. PATENT DOCUMENTS 11,827,779 B2 * 11/2023 Ratnagiri ................ C08L 59/02

FOREIGN PATENT DOCUMENTS

| | | | | | |
|---|---|---|---|---|---|
| CN | 103435834 | A | | 12/2013 | |
| CN | 106366558 | A | * | 2/2017 | ............. C08L 59/00 |
| EP | 0595886 | B1 | | 5/2001 | |
| WO | 2013081785 | A1 | | 6/2013 | |

OTHER PUBLICATIONS

Odian, G., Principles of Polymerization, Third Edition, John Wiley & Sons, Inc., 1991, pp. 19-24.*

Machine English translation of CN 106366558, Zhang, Feb. 1, 2017.*

* cited by examiner

*Primary Examiner* — Patrick D Niland

(74) *Attorney, Agent, or Firm* — Mendelsohn Dunleavy, P.C.

(57) ABSTRACT

Described herein are polyoxymethylene (POM) compositions comprising polyoxymethylene and styrene maleic anhydride (SMA) copolymers or modified SMA copolymers, said POM compositions exhibiting improved physical properties such as heat deflection temperatures compared to POM compositions which do not comprise SMA copolymers.

19 Claims, 2 Drawing Sheets

POLYOXYMETHYLENE COMPOSITIONS

CROSS-REFERENCES TO RELATED APPLICATIONS

This application claims priority under 35 U.S.C. § 120 as a continuation of U.S. application Ser. No. 17/440,157, filed on Sep. 16, 2021, now allowed, which in turn claims priority under 35 U.S.C. §§ 365 and 371 to International Application No. PCT/US2020/022698, filed on Mar. 13, 2020, which in turn claims priority to U.S. Provisional Appln. No. 62/817,689, filed on Mar. 13, 2019, each of which is incorporated herein by reference in its entirety.

OVERVIEW

Described herein are polyoxymethylene (POM) compositions comprising polyoxymethylene and styrene maleic anhydride (SMA) copolymers or modified SMA copolymers, said POM compositions exhibiting improved physical properties such as heat deflection temperatures compared to POM compositions which do not comprise SMA copolymers.

POM compositions having a relatively high molecular weight, i.e., between 50, 000 and 100,000, may be used to prepare articles by any of the techniques commonly used with thermoplastic materials such as compression molding, injection molding, extrusion, blow molding, melt spinning, stamping and thermoforming. Articles made from such relatively high molecular weight POM compositions possess desirable physical properties, such as stiffness, strength, toughness, dimensional stability, and solvent resistance. POM compositions are commonly used in the automotive, industrial, electronic, and consumer goods industries.

Unmodified or neat POMs typically have a heat deflection temperature (HDT) of about 96° C. and good melt viscosity retention. For many engineering applications, POM compositions having a HDT of 100° C. or greater is desirable. A conventional method to increase HDT of POMs has been to add a reinforcing agent such as glass fibers. Although increasing HDT, the addition of glass fibers increases weight, promotes poor surface appearance, create molding difficulties, and decreases toughness.

Efforts to improve heat stability of articles prepared from POM compositions by adding materials such as heat stabilizers and other additives to the POM compositions may improve heat stability at the detriment of another physical property.

International Pat. Pub. No. WO2013/081785 discloses polyoxymethylene compositions comprising imidized acrylic resins which exhibit improved heat deflection temperatures.

U. S. Pat. App. Pub. No. 2008/0097012 discloses a polyoxymethylene composition comprising a combination of an amine-substituted triazine compound, a compound prepared by grafting 0.05-5 parts by weight of anhydrous maleic acid onto an ethylene-propylene copolymer and an ethylene-propylene terpolymer, and 1,12-dodecanedicarboxylic acid. Such compositions exhibit improved thermal stability.

U.S. Pat. No. 6,191,222 discloses a polyoxymethylene composition comprising a conventional additive and a copolymer obtained by polymerizing a mixture of one or more (meth)acrylates and one or more (meth)acrylamides. Such compositions exhibit improved heat stability and stability against discoloration.

International Pat. Pub. No. WO90/15840 discloses a polyacetal composition consisting essentially of a stabilizer selected from microcrystalline cellulose and fibrous cellulose and a co-stabilizer. These compositions provide an improvement in thermal stability of the polyacetal compositions.

It is desirable to develop POM compositions with increased heat deflection temperatures, and if possible, to simultaneously improve HDT while maintaining or improving other desirable physical properties such as melt viscosity stability and creep properties.

GENERALLY

Described herein are POM compositions comprising:

(A) 80 to 99 weight percent of at least one polyoxymethylene polymer;

(B) 1 to 20 weight percent of at least one styrene maleic anhydride copolymer; and (C) optionally 0.5 to 5 weight percent of at least one additive selected from the group consisting of antioxidants and heat stabilizers;

wherein the POM composition exhibits a heat deflection temperature of at least 100° C. when measured according to ISO 75-2A: 2013; and wherein weight percent is based on the weight of components (A), (B), and (C) in the POM composition and totals 100 weight percent.

Additionally described herein are POM compositions comprising:

(A) 80 to 99 weight percent of at least one polyoxymethylene polymer;

(B) 1 to 20 weight percent of at least one modified styrene maleic anhydride copolymer having an acid value of 50 mg KOH/g or less when measured according to ASTM D974-14; and (C) optionally 0.5 to 5 weight percent of at least one additive selected from the group consisting of antioxidants and heat stabilizers;

wherein weight percent is based on the weight of components (A), (B), and (C) in the POM composition and totals 100 weight percent; and wherein the POM composition exhibits a heat deflection temperature of at least 100° C. when measured according to ISO 75-2A: 2013.

These POM compositions comprising modified SMA copolymers may also exhibit a melt viscosity retention of at least 90 percent when measured at 215° C., 100 $sec^{-1}$ shear rate after 20 min of holdup time.

These POM compositions comprising modified SMA copolymers may further exhibit a tensile creep to 10% strain of at least 2 hours when measured at 90° C. and 25 MPa load as determined according to ISO 899-1:2017.

Also described herein are articles comprising the POM compositions described herein. Depending on the POM composition used to prepare articles, the articles have at a minimum a heat deflection temperature determined according to ISO 75-2 that exceeds that of an identical article but which does not comprise said SMA copolymers or modified SMA copolymers. It was surprisingly discovered that certain POM compositions described herein exhibit a combination of improved physical properties compared to POM compositions which do not comprise a modified SMA copolymer. Specifically, articles prepared from these POM compositions may exhibit a combination of properties including a heat deflection temperature of at least 100° C. when measured according to ISO 75-2A: 2013, a tensile creep to 10% strain at 90° C. and 25 MPa pressure of at least 2 hours as determined according to ISO 899-1:2017, and a melt viscosity retention of at least 90 percent when measured at 215° C., 100 $sec^{-1}$ shear rate after 20 min of holdup time.

Also described herein are methods for preparing articles comprising the POM composition, the method comprising:

(1) melt blending at least one polyoxymethylene resin with at least one copolymer and/or modified copolymer and any optional additives to provide a molten POM composition;

(2) forming the molten POM composition into a desired shape; and (3) cooling the molten POM composition to provide a shaped article;

wherein the shaped article has a heat deflection temperature determined according to ISO 75-2A: 2013 of at least 100° C.

It is preferred that when the SMA copolymer(s) is melt blended with the polyoxymethylene resin, that the particle size of the SMA copolymer be within a specific range in order for the shaped article to exhibit the desired properties.

DETAILED DESCRIPTION OF THE INVENTION

Definitions

Figure 1:
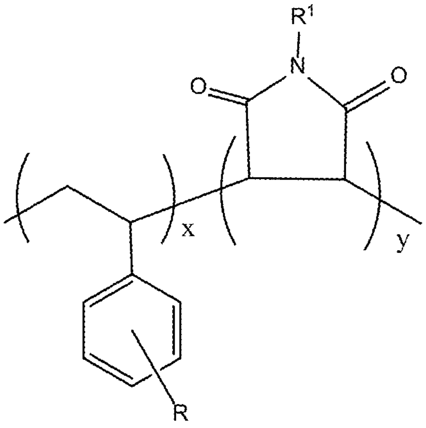
FIG. 1 shows an example of a modified SMA copolymer in which the anhydride functional group has been reacted to form an imide functional group.

The following definitions are to be used to interpret the meaning of the terms discussed in the description and recited in the claims.

As used herein, the article "a" indicates one as well as more than one and does not necessarily limit its referent noun to the singular.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that will be included in a finished article and/or will undergo further processing in order to become a finished article. As used herein, when an article is finished, the term "article" refers to an item, thing, object, element, device, etc. that has undergone processing to completion to thereby be suitable for a particular use/purpose.

As used herein, the term "melt viscosity" refers to a measure of the ability of a thermoplastic polymer composition melt to flow. Melt viscosity is measured according to ASTM D-3835-08 at 215° C. and 100 $sec^{-1}$ shear rate. The units for melt viscosity are Pa·sec. The lower the melt viscosity value the better the ability of the thermoplastic composition to flow in the melt state.

As used herein, the terms "polyoxymethylene" and "polyoxymethylene resin" refer to one or more homopolymers, copolymers, and mixtures of these, having a repeating unit of $\cdot CH_2O\cdot$. The terminal groups of these polymers are derived by initiating, terminating, or chain-transferring groups, such as water or alcohols, or by chemical reaction, such as that resulting in ester or ether groups, including acetate, acetyl, alkyl or methoxy groups.

As used herein, the term "tensile creep" and "tensile creep to 10% strain" refer generally to the time a test sample took to reach a specified percent strain under a certain load and at a certain temperature. The term "tensile creep to 10% strain at 90° C. and 25 MPa load" refers to the time for the test sample, heated to 90° C., to reach 10% strain under a load of 25 MPa. Tensile creep to strain is determined according to ISO 899-1:2017 and informs on the long-term creep resistance of a molded test sample under specific conditions.

As used herein, the terms "heat distortion temperature", "heat deflection temperature", and "HDT" refer to the temperature at which a polymer sample deforms under a specified load. The determination is done according to ISO-75-2A: 2013, with a load of 1.8 MPa.

Abbreviations

The claims and description herein are to be interpreted using the abbreviations and definitions set forth below.

"%" refers to the term percent.
"wt %" refers to weight percent
"sec" refers to seconds
"min" refers to minute
"g" refers to grams
"ml" refers to milliliter
"mg" refers to milligram
"Tg" refers to glass transition temperature
"kg" refers to kilogram
"Pa·sec" refers to Pascal·seconds
"MPa" refers to Megapascal
"Mw" refers to weight average molecular weight Ranges and Preferred Variants Any range set forth herein includes its endpoints unless expressly stated otherwise. Setting forth an amount, concentration, or other value or parameter as a range specifically discloses all ranges formed from any pair of any upper range limit and any lower range limit, regardless of whether such pairs are separately disclosed herein. The processes and articles described herein are not limited to the specific values disclosed in defining a range in the description.

The disclosure herein of any variants in terms of materials, methods, steps, values, and/or ranges, etc.—whether identified as preferred variants or not—of the processes, compositions and articles described herein is specifically intended to disclose any process and article that includes ANY combination of such materials, methods, steps, values, ranges, etc. For the purposes of providing photographic and sufficient support for the claims, any such disclosed combination is specifically intended to be a preferred variant of the processes, compositions, and articles described herein.

The compositions described herein include all possible variations when the polyoxymethylene polymer is selected from the group consisting of polyoxymethylene homopolymers, polyoxymethylene copolymers, and mixtures of these.

POM Compositions

POM compositions described herein which comprise at least one SMA copolymer or modified SMA copolymer exhibit an improved heat deflection temperature compared to an identical POM composition lacking a SMA copolymer. Specifically, the HDT of POM compositions described herein is at least 100° C., preferably at least 102° C. and more preferably at least 104° C.

POM compositions comprising at least one modified SMA copolymer surprisingly exhibit a combination of improved HDT, creep resistance, and melt viscosity stability compared to an identical POM composition lacking a modified SMA copolymer.

Polyoxymethylene (A)

The polyoxymethylenes used in the POM compositions described herein include homopolymers, copolymers and mixtures of these. Polyoxymethylene homopolymers include homopolymers of formaldehyde or cyclic oligomers of formaldehyde, e.g., trioxane and tetraoxane. POM homopolymer is preferred because of its greater stiffness and strength. Preferred polyoxymethylene homopolymers include those whose terminal hydroxyl groups have been end-capped by a chemical reaction to form ester or ether groups, preferably acetate or methoxy groups, respectively.

Polyoxymethylene copolymers include copolymers of formaldehyde or cyclic oligomers of formaldehyde and monomers that yield oxyalkylene groups having at least two adjacent carbon atoms in the polymer chain. Comonomers commonly used in preparing polyoxymethylene copolymers include those without alkylene oxides and those with alkylene oxides of 2-12 carbon atoms and their cyclic addition products with formaldehyde. The comonomer generally is not more than about 20 weight percent, preferably not more than about 15 weight percent, and most preferably about 2 weight percent, of the total weight of the polyoxymethylene polymer.

The polyoxymethylene polymers in the POM compositions described herein can be characterized by polymer melt flow rate, which ranges from any decimal value from 0.1 g/10 min. up to and including 50 g/10 min. Preferably, the POMs in the POM compositions described herein have a melt flow rate of from 0.5 to 35 grams/10 minutes, more preferably about 1 to 20 gram/10 minutes, and most preferably about 1 to 5 gram/10 minutes.

The concentration of polyoxymethylene polymers in the POM compositions may range from about 80 to about 99 weight percent, preferably from about 85 to 98 weight percent, more preferably from about 90 to 95 weight percent, based on the total weight percent of components (A), (B), and (C) in the POM composition, the sum of which totals 100 weight percent.

Styrenic Maleic Anhydride Copolymers (B)

Styrenic maleic anhydride copolymers which are useful as copolymer (B) in the POM compositions described herein include SMA copolymers and modified SMA copolymers and may comprise a range of maleic anhydride (MA) monomer content with a practical limit of about 50 mol % maximum MA content in the SMA or modified SMA copolymers (a 1:1 molar ratio of styrene:MA). Molecular weights of the SMA or modified SMA copolymers are preferably less than or equal to about 20,000 g/mol, more preferably less than or equal to about 10,000 g/mol with a minimum molecular weight of about 2,500 g/mol. The glass transition temperature of the SMA or modified SMA copolymers may range from about 125° C. to about 160° C., preferably about 130 to about 155° C., more preferably about 135 to about 150° C.

Modified SMA copolymers are copolymers in which the anhydride functional group has been converted or modified into other functional groups, resulting in said modified SMA copolymer having an acid value of 50 mg KOH/g or less. The SMA copolymers may be modified by any known method in the art for converting anhydride functional groups into other functional groups. For example, the SMA copolymer may be modified by converting the anhydride functional group into an imide functional group, ester functional groups, amide functional groups, and other functional groups resulting in a modified SMA copolymer having an acid value of 50 mg KOH/g or less. To achieve an acid value of 50 mg KOH/g or less, most or essentially all of the anhydride functional groups present in the SMA copolymer should be converted into other functional groups which do not contribute to the acid value such as imide, ester, or amide groups.

Molecules which may be used to convert the anhydride functional groups of the SMA copolymers into imide functional groups include molecules which comprise primary and/or secondary amino groups with primary amino groups being preferred. Examples of such molecules include linear, branched, or cyclic aliphatic primary amines and aromatic primary amines. Examples of aliphatic primary amines include amines which comprise 1 to 20 carbon atoms such as propyl amine, butyl amine, octyl amine, and cyclohexyl amine. Examples of aromatic primary amines include aniline, 4-aminophenol, 2-aminophenol. 4-aminotoluene and 2-aminotoluene.

Molecules which may be used to convert the anhydride functional groups of the SMA copolymers into ester functional groups include molecules which comprise hydroxyl groups such as phenol, C2 to C10 linear, branched, cyclic, or aromatic alcohols such as methanol, ethanol, hexanol, cyclohexanol, and phenol.

FIG. 1 shows an example of a modified SMA copolymer in which the anhydride functional group has been reacted to form an imide functional group. $R^1$ is selected from an aliphatic or aromatic substituent group including linear, branched, or cyclic aliphatic groups comprising from one to 20 carbon atoms. Examples of aliphatic substituent groups for $R^1$ include such as methyl, ethyl, n-propyl, s-propyl, butyl, hexyl, octyl, decyl, dodecyl, and cyclohexyl substituents. Examples of aromatic substituent groups for R1 include phenyl, tolyl, and substituted phenyl such as 4-aminophenyl, 2-aminophenyl, 4-aminotolyl, 2-aminotolyl, 4-methylphenyl, 2-methylphenyl, and other substituted phenyl groups.

R can be hydrogen or a linear, branched, or cyclic aliphatic substituent comprising from one to 20 carbon atoms or an aromatic substituent on the phenyl ring. The phenyl ring in FIG. 1 can be substituted with more than one R group. For example, the phenyl ring can have methyl groups at both the 2 and 4 ring positions.

Figure 2:
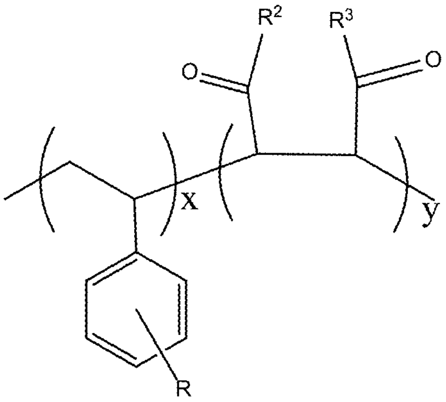
FIG. 2 shows an example of a modified SMA copolymer in which the anhydride functional group has been reacted to form functional groups such as amide or ester functional groups.

FIG. 2 shows an example of a modified SMA copolymer in which the anhydride functional group has been reacted to form functional groups such as amide or ester functional groups. $R^2$ and $R^3$ are preferably the same and can be —$NR^4R^5$ or —$OCR^6R^7R^8$ substituents. $R^4$, $R^5$, $R^6$, $R^7$, and $R^8$ can be the same or different and can be selected from aliphatic or aromatic substituent groups including linear, branched, or cyclic aliphatic groups comprising from one to 20 carbon atoms. Examples of aliphatic substituent groups for $R^4$ and $R^5$ or $R^6$, $R^7$, and $R^8$ include methyl, ethyl, n-propyl, s-propyl, butyl, hexyl, octyl, decyl, dodecyl, and cyclohexyl substituents. Examples of aromatic substituent groups for $R^4$, $R^5$, $R^6$, $R^7$, and $R^8$ include phenyl, tolyl, and substituted phenyl such as 4-methylphenyl, 2-methylphenyl, and other substituted phenyl groups. R in FIG. 2 is the same as that in FIG. 1.

For FIGS. 1 and 2, the molar ratio of styrenic monomer to maleic anhydride monomer (x:y) may range from about 1:1 to about 6:1 molar ratio, preferably from about 2:1 to about 4:1 molar ratio. In other words, x can range 1 to 6 when y is 1.

Preferably, the modified SMA copolymers comprise essentially no anhydride functional groups. In other words, the concentration of residual anhydride functional groups in the modified SMA copolymers should be low enough such that the acid value of the modified SMA copolymers is 50 mg KOH/g or less of modified SMA copolymer, preferably 25 mg KOH/g, more preferably 10 mg KOH/g or less.

The SMA copolymers used in the POM compositions described herein have a molecular weight (Mw) ranging from about 2,500 g/mol to about 20,000 g/mol, preferably from about 5,000 to 20,000 g/mol, and more preferably from about 5,000 to 15,000 g/mol. It is understood that the modified SMA copolymers are typically prepared from the SMA copolymers and that the molecular weight range of the modified SMA copolymers will typically be greater than the molecular weight of the SMA copolymer. Therefore, for purposes of determining the molecular weight of the modified SMA copolymers, it is assumed modified SMA copolymers are prepared from SMA copolymers having the molecular weight range described above. One of skill in the art can easily calculate the molecular weight of the modified SMA copolymer based on the molecular weight of the starting SMA copolymer.

The glass transition temperature of the SMA copolymers and modified SMA copolymers ranges from about 125° C. to about 160° C. Thus, when preparing modified SMA copolymers from SMA copolymers it is important that the resulting modified SMA copolymer have a glass transition temperature that is within the range of about 125° C. to about 160° C.

Additionally, the SMA copolymers and modified SMA copolymers, when dispersed within the POM matrix of the POM composition, should be uniformly dispersed within the POM composition and be dispersed as discrete domains/particles ranging in size (average) from about 5 to about 0.1 microns or less, preferably from about 4 to 0.5 microns, and more preferably from about 3 to 0.5 microns. There is no absolute minimum particle size which can be used and is limited only by the ability to disperse particles having an average particle size of less than about 0.5 microns. It is within one of skill in the art to determine that the average particle size is below 0.5 microns.

The concentration of SMA or modified SMA copolymers in the POM compositions may range from about 0.1 to about 20 weight percent, preferably from about 0.5 to 8 weight percent, more preferably from about 1 to 8 weight percent, based on the total weight percent of components (A), (B), and (C) in the POM compositions.

Additives (C)

Optional additives which may be used in the POM compositions disclosed herein include, but are not limited to heat stabilizers such as polyacrylamides, processing aids, light/UV stabilizers, antioxidants, colorants, nucleating agents, lubricants, mold release agents, plasticizers, reinforcing agents, antistatic agents, and surfactants. However, some additives can destabilize the melt viscosity of POM compositions by reaction of one or more of their chemical groups with the POM. This may lead to a breakdown in POM molecular weight, resulting in a lowering of viscosity of the POM melt. Therefore, additives that preserve melt stability are preferred in these POM compositions. The total concentration of all additional additives should not exceed about 5 weight percent, preferably about 3 weight percent, and more preferably about 2 weight percent or less of the total weight of all ingredients in the POM composition.

Optional additives should not include materials which can hydrolyze to acids or contain free acid groups. Such materials may cause depolymerization of the POM.

Examples of suitable antioxidants are sterically hindered phenolic compounds, aromatic secondary amines and phosphites. Examples of sterically hindered phenol include, N,N'-hexane-1,6-diylbis(3-(3,5-di-tert·-butyl-4-hydroxyphenylpropionamide)), Pentaerythritol tetrakis(3-(3,5-di-tert-butyl-4-hydroxyphenyl) propionate), Octadecyl-3-(3,5-di-tert·butyl-4-hydroxyphenyl)-propionate, 1,3,5-Trimethyl-2,4,6-tris(3,5-di-tert-butyl-4-hydroxybenzyl)benzene, 2',3 bis [3,5 ditertiary butyl, 4 hydroxyphenyl) propionyl]propionohydrazide, N,N' hexane-1,6-diylbis [3,5 ditertiary butyl-4-hydroxyphenyl propionamide or the like. N,N'-hexane-1,6-diylbis(3-(3,5-di-tert·-butyl-4-hydroxyphenylpropionamide)) is preferred. Examples of aromatic secondary amines include 4, 4'-Bis(alpha, alpha-dimethylbenzyl) diphenylamine, 2,4-Bis(n-octylthio)-6-(4'-hydroxy-3,5-di-tbutylanilino)-1,3,5-triazine. Examples of phosphites include Tris(2,4-di-t-butylphenyl) phosphite, Tris(nonylphenyl) phosphite, Diphenyl mono(tridecyl) phosphite and similar. Nonlimiting commercial examples of antioxidants include hindered phenol antioxidants, such as Irganox® 245, 1098, and 1090, and 1010 available from BASF.

Suitable thermal stabilizers include calcium carbonate, magnesium carbonate, and calcium stearate. Suitable ultraviolet light stabilizers include benzotriazoles, benzophenones, aromatic benzoates, cyano acrylates, and oxalic acid anilides.

Examples of reinforcing agents which may be used in the POM compositions described herein include, but not limited to, glass fibers, glass beads, ceramics, calcium carbonate, metal oxides such as alumina oxide, silicates, titanium dioxide, sulfates such as barium sulfate, titanates, kaolin clay, magnesium hydroxide, talc, wollastonite; minerals, graphite, carbon fiber, carbon black, and combinations of these.

Suitable lubricant additives include silicone lubricants such as dimethylpolysiloxanes and their derivatives; oleic acid amides; alkyl acid amides. Other suitable additives include non-ionic surfactant lubricants; hydrocarbon waxes; chlorohydrocarbons; fluorocarbons; oxy-fatty acids; esters such as lower alcohol esters of fatty acids; polyvalent alcohols such as polyglycols and polyglycerols; and metal salts of fatty acids, such as lauric acid and stearic acid. Suitable nucleating agents include titanium oxides and talc.

Making POM Compositions Described Herein and Articles from them

The POM compositions described herein are melt-mixed blends, wherein the SMA copolymers and/or the modified SMA copolymers are well-dispersed within the POM resin and any optional additives, when present, are well-dispersed in and bound by the polymer matrix, such that the blend forms a unified whole. It is understood that some of the additional additives may be present as solid particles during melt-processing. The POM compositions can be made by blending the components in any order or combination, at any convenient temperature, preferably at or above the melting point of the POM.

Any melt-mixing method may be used to combine the polymeric components (POM and SMA copolymers) and any additional additives. For example, the polymeric components and additives may be added to a melt mixer, such as a single or twin-screw extruder; a blender; a single or twin-screw kneader; or a Banbury mixer, either all at once in a single step addition, or sequentially in a stepwise fashion, and then melt-mixed. When adding the polymeric components and additives in a stepwise fashion, part of the polymeric components and/or additives are typically first added and melt-mixed, and then the remaining polymeric components and additives are subsequently added and further melt-mixed to obtain a well-mixed composition.

The POM compositions described herein may be molded or shaped into articles using methods known to those skilled in the art, such as injection molding, blow molding, injection blow molding, extrusion, thermoforming, melt casting, vacuum molding, rotational molding, calendar molding, and slush molding. Examples of molded articles include gears, sliding and guiding elements, housing parts, springs, chains, screws, nuts, fan wheels, turbine blades, pump parts, valve bodies, insulators, connectors, parts for electronic devices such as televisions, telephones, automotive lights, etc., fuel sender units, aerosol cans, vehicle storage tanks, coffee brewer parts, and handles and grips for guns and knives.

Articles prepared from the POM compositions described herein exhibit at a minimum an improvement in HDT compared to POM compositions which do not comprise SMA copolymers. Additionally, POM compositions comprising modified SMA copolymers exhibit a combination of properties including improved HDT, time to 10% creep strain, and melt viscosity stability compared to identical POM compositions but which do not comprise modified SMA copolymers. The combination of improved HDT, improved time to 10% creep strain, and improved melt viscosity retention compared to an identical POM composition lacking at least one modified SMA copolymer is unexpected.

EXAMPLES

The Examples (E) and Comparative Examples (C) below are intended only to further explicate and not to limit the scope of the compositions and articles described herein.

Methods

In the compositions listed in the tables below, the following methods were used:

Melting Point and Glass Transition Temperatures

Melting points and Glass Transition Temperatures were determined on a Q1000 unit from TA Instruments. Melting points were determined at a scan rate of 10° C./min in the first heating scan, wherein the melting point was taken at the maximum of the endothermic peak.

Tensile Creep

Tensile creep, that is, the time to 10% strain, was performed at 90° C., under a load of 25 MPa. The strain was determined according to ISO 899-1:2017 and the test was stopped once the measured strain reached 10%.

Heat Deflection Temperature (HDT)

A Nissei 4000 molding machine was used to mold ISO 527, 4 mm test bars with a cycle time of 60 s and a melt temperature of 215° C. The test bars were used for Heat Deflection Temperature measurements according to ISO 75-2A: 2013 method at a 1.8 MPa load.

Melt Viscosity Retention

Melt viscosity retention was determined by measuring the melt viscosity of the POM compositions after 6 minutes holdup time at 215° C. (this allows sufficient time for the POM compositions to reach equilibrium in the melt state) which is the "initial" melt viscosity and then continue holding the POM compositions in the melt state at 215° C. for 20 min of holdup time (14 minutes from the 6 minute mark) and then remeasuring the melt viscosity. The melt viscosity after 20 min holdup time was compared to the initial melt viscosity and recorded as the percent melt viscosity retained after 20 minutes. For example, if the initial melt viscosity is 90 Pa·s and the melt viscosity after 20 minutes holdup time is 85 Pa·s, the melt viscosity retention is 85/90 or about 94.4 percent. Melt viscosity measurements were made at 215° C. at a shear rate of 100 $s^{-1}$ according to ASTM D3835-08. Stable compositions have close to 100% melt viscosity retention.

Acid Value

Acid value was determined according to ASTM D974-14 except a xylene/butanol/propylene glycol solvent mixture (75/15/10 volume ratio) was used as the solvent. 4 g of material to be tested was added to the solvent mixture and dissolved by heating to reflux. The solution was titrated with a 0.1N KOH solution to the end point. Phenolphthalein indicator was used to mark the end point. The resulting acid value is expressed as mg KOH/g copolymer.

Melt Flow Rate

Melt flow rate was determined according to ASTM D1238:2013 (190° C., 2.16 kg).

Molecular Weight

Molecular weight was determined using size exclusion chromatography. An Alliance 2690™ from Waters Corporation (Milford, MA) was used in combination with a Waters 410™ differential refractive index detector (DRI) and Viscotek Corporation (Houston, TX) Model T-60A™ dual detector module (Trisec® Triple Detector SEC version 3.0) incorporating static right-angle light scattering and differential capillary viscometer detectors.

Samples were prepared by dissolution of the polymer being tested in HFIP at 23° C. (room temperature) with moderate agitation for 2 hours. Sample concentrations are selected to be approximately 2 mg/ml. All sample solutions are filtered with a 0.45 micron PTFE membrane filter prior to injection.

Two Shodex GPC HFIP-806M™ styrene-divinyl benzene columns with exclusion limit $2\times10^7$ and 8,000/30 cm theoretical plates and one Shodex GPC HFIP-804M™ styrene-divinyl benzene column with exclusion limit $2\times10^5$ and 10,000/30 cm theoretical plates were used for separation. Temperature of the columns was 35° C. with a flow rate of 1.00 ml/min and an injection volume of 100 microliters. Run time was about 50 min. The solvent used was 1,1,1,3,3,3-hexafluoro-2-propanol (HFIP) with 0.01 M sodium trifluoroacetate This triple detection method incorporates data from all three detectors: refractometer, viscometer and light scattering photometer (right angle). Flory-Fox equation is used for angular asymmetry light scattering correction. No column calibration is involved in data processing.

Particle Size

Particle size of the dispersed SMA copolymers or modified SMA copolymers was determined by taking molded test bars of the POM compositions (same as for HDT testing) and cryo-ultra-micromed the test bars into 20 micron sections that were stained with $OsO_4$ and prepared for imaging in a Transmission Electron Microscope. The SMA copolymers are preferentially stained. The images were post processed using ImageJ® processing software to measure the particle size of the dispersion.

Compounding and Molding

All compounding was carried out on a 26 mm Werner & Pfleiderer twin-screw extruder at a melt temperature of 203° C. All materials were fed into the rear of the extruder. The resulting extrudates were quenched in a water bath and pelletized. The pellets were subsequently oven dried at 80° C. for 4 hours. Dried pellets were used for melt viscosity measurements and molding of test bars.

Materials:

POM-100: a polyoxymethylene homopolymer having a melting point of 178° C. and a melt flow rate of 2.5 g/10 minutes, measured at 190° C. using a 2.16 kg weight, available from E.I. DuPont de Nemours and Company, Wilmington, Delaware, USA [DuPont] as DELRIN® 100.

SMA-1: a styrene maleic anhydride copolymer having a 1:1 molar ratio of styrene:maleic anhydride, a reported Tg of 155° C., an acid value of 465-495 mg KOH/g, a Mw of 5000, and available from Total Cray Valley, Exton PA, USA as SMA 1000.

SMA-2: a styrene maleic anhydride copolymer having a 2:1 molar ratio of styrene:maleic anhydride, a reported Tg of 137° C., an acid value of 335-375 mg KOH/g, a Mw of 7500, and available from Total Cray Valley, Exton PA, USA as SMA 2000.

SMA-3: a styrene maleic anhydride copolymer having a 3:1 molar ratio of styrene:maleic anhydride, a reported Tg of 125° C., an acid value of 255-305 mg KOH/g, a Mw of 9500, and available from Total Cray Valley, Exton PA, USA as SMA 3000.

SMA-4: a styrene maleic anhydride copolymer having a 4:1 molar ratio of styrene:maleic anhydride, a reported Tg of 116.5° C., an acid value of 195-235 mg KOH/g, a Mw of 11,000, and available from Total Cray Valley, Exton PA, USA as SMA 4000.

SMA-5: SMA 4000 which has been imidized with 4-aminophenol and having a reported Tg of 148° C. and available from Total Cray Valley, Exton PA, USA as SMA EP 400.

SMA-6: SMA 4000 which has been about 50% imidized with 4-aminophenol and having a reported Tg of 136° C., and available from Total Cray Valley, Exton PA, USA as SMA EP 450.

AO-1: Irganox® 1098, a sterically hindered phenolic antioxidant, with molecular weight of 637 g/mol, available from BASF.

HS-1: MAP 1070, a polyacrylamide thermal stabilizer and is a 20 weight percent polyethylene glycol coated polyacrylamide with weight-average molecular weight (Mw) of 24,000 g/mol and a polydispersity index of 3.1 by aqueous gel permeation chromatography, available from DuPont.

Table 1 shows the physical properties of POM compositions comprising various SMA copolymers (E1-E4). Compared to a POM composition which does not comprise an SMA copolymer (control), examples E1-E4 all exhibit an HDT which is at least 4 percent or 4° C. greater than the control. The 10% creep strain is also improved in all the examples by at least 200% relative to the control. It appears that as the maleic anhydride content of the SMA copolymer increases, the MV retention of the POM compositions improves relative to examples having an SMA copolymer comprising a lower maleic anhydride content.

TABLE 1

| | Control | E1 | E2 | E3 | E4 |
|---|---|---|---|---|---|
| POM-1 | 99.35 | 96.85 | 96.85 | 94.35 | 94.35 |
| SMA-2 | | 2.5 | | | |
| SMA-3 | | | 2.5 | 5 | |
| SMA-4 | | | | | 5 |
| AO-1 | 0.15 | 0.15 | 0.15 | 0.15 | 0.15 |
| HS-1 | 0.5 | 0.5 | 0.5 | 0.5 | 0.5 |
| Physical Properties | | | | | |
| HDT (° C.) | 96 | 109 | 104 | 106 | 100 |
| MV Retention (%) | 100 | 33 | 59 | 47 | 77 |
| 10% Creep Strain (h) | 0.75 | 4.12 | 3.77 | n/m | n/m |

The results in Table 2 show the physical properties of POM compositions which comprise modified SMA copolymers having: i) an acid value of 50 mg KOH/g or less ii) a molecular weight (Mw) ranging from about 2,500 g/mol to about 20,000 g/mol, and iii) a glass transition temperature ranging from about 125° C. to about 160° C., surprisingly exhibit a combination of improved HDT, creep resistance, and melt viscosity stability compared to an identical POM composition lacking a copolymer. Examples E5-E8 all show improved HDT, MV retention, and creep to 10% strain compared to the control which is identical to the examples except the control does not comprise any modified SMA copolymers.

TABLE 2

| | Control | E5 | E6 | E7 | E8 |
|---|---|---|---|---|---|
| POM-1 | 99.35 | 96.85 | 94.35 | 96.85 | 94.35 |
| SMA-5 | | 2.5 | 5 | | |
| SMA-6 | | | | 2.5 | 5 |
| AO-1 | 0.15 | 0.15 | 0.15 | 0.15 | 0.15 |
| HS-1 | 0.5 | 0.5 | 0.5 | 0.5 | 0.5 |
| HDT (° C.) | 96 | 103 | 106 | 101 | 105 |
| MV Retention (%) | 100 | 99 | 98 | 100 | 100 |
| 10% Creep Strain (h) | 0.75 | 3 | 3.3 | n/m | 2.45 |

What is claimed is:

1. A polyoxymethylene (POM) composition comprising:

(A) 80 to 99 weight percent of at least one polyoxymethylene polymer;

(B) 1 to 20 weight percent of at least one styrene maleic anhydride copolymer, said styrene-maleic anhydride copolymer consisting of copolymerized monomers of styrene and maleic anhydride; and (C) optionally 0.5 to 5 weight percent of at least one additive;

wherein the POM composition exhibits a heat deflection temperature of at least 100° C. when measured according to ISO 75-2A:2013; and wherein weight percent is based on the weight of components (A), (B), and (C) in the POM composition and totals 100 weight percent.

2. The polyoxymethylene composition of claim 1 wherein the polyoxymethylene polymer is a homopolymer.

3. The polyoxymethylene composition of claim 1 wherein the styrene maleic anhydride copolymer has a weight average molecular weight of about 2,500g/mol to about 20,000 g/mol; wherein the styrene maleic anhydride copolymer has a styrene: maleic anhydride molar ratio ranging from about 1:1 to 6:1; or wherein the styrene maleic anhydride copolymer has a glass transition temperature ranging from 125 to 160° C.

4. The polyoxymethylene composition of claim 1 wherein optional additive (C) is present and comprises an antioxidant, a heat stabilizer, or both an antioxidant and a heat stabilizer.

5. The polyoxymethylene composition of claim 4 wherein the antioxidant comprises a sterically hindered phenolic compound or wherein the heat stabilizer comprises a polyacrylamide.

6. A polyoxymethylene composition comprising:

(A) 80 to 99 weight percent of at least one polyoxymethylene polymer;

(B) 1 to 20 weight percent of at least one modified styrene maleic anhydride copolymer having an acid value of 50 mg KOH/g or less that is the product of modifying a styrene-maleic anhydride copolymer consisting of copolymerized monomers of styrene and maleic anhydride; and (C) optionally 0.5 to 5 weight percent of at least one additive;

wherein weight percent is based on the weight of components (A), (B), and (C) in the polyoxymethylene composition and totals 100 weight percent; and wherein the polyoxymethylene composition exhibits:

a heat deflection temperature of at least 100° C. when measured according to ISO 75-2A: 2013;

a tensile creep to 10% strain of at least 2 hours when measured at 90° C. and 25 MPa load as determined according to ISO 899-1:2017; and a melt viscosity retention of at least 90 percent when measured at 215° C., 100 $sec^{-1}$ shear rate after 20 min of holdup time.

7. The polyoxymethylene composition of claim 6 wherein the polyoxymethylene polymer is a homopolymer.

8. The polyoxymethylene composition of claim 6 wherein the modified styrene maleic anhydride copolymer is prepared from a styrene maleic anhydride copolymer having a weight average molecular weight of about 2,500 g/mol to about 20,000 g/mol; wherein the modified styrene maleic anhydride copolymer has a styrene: maleic anhydride molar ratio ranging from about 1:1 to 6:1; or wherein the modified styrene maleic anhydride copolymer has a glass transition temperature ranging from 125 to 160° C.

9. The polyoxymethylene composition of claim 6 wherein optional additive (C) is present and comprises an antioxidant, a heat stabilizer, or both an antioxidant and a heat stabilizer.

10. The polyoxymethylene composition of claim 9 wherein the antioxidant is a sterically hindered phenolic compound; or wherein the heat stabilizer is a polyacrylamide.

11. The polyoxymethylene composition of claim 6 wherein the modified styrene maleic anhydride copolymer is an imidized styrene maleic anhydride copolymer, an esterified styrene maleic anhydride copolymer, or an amidized styrene maleic anhydride copolymer.

12. An article comprising the polyoxymethylene composition of claim 1.

13. The article of claim 12 which is in a form selected from the group consisting of a gear, a sliding and guiding element, a housing part, a spring, a chain, a screw, a nut, a fan wheel, a turbine blade, a pump part, a valve body, an insulator, a connector, a part for an electronic device, a fuel sender unit, an aerosol can, a vehicle storage tank, a coffee brewer part, and a handle for a gun or knife.

14. The polyoxymethylene composition of claim 1 wherein the styrene maleic anhydride copolymer is dispersed within the polyoxymethylene matrix resin as discrete particles having a particle size ranging from about 5 to 0.1 microns.

15. The polyoxymethylene composition of claim 6 wherein the styrene maleic anhydride copolymer is dispersed within the polyoxymethylene matrix resin as discrete particles having a particle size ranging from about 5 to 0.1 microns.

16. An article comprising the polyoxymethylene composition of claim 6.

17. The article of claim 16 which is in a form selected from the group consisting of a gear, a sliding and guiding element, a housing part, a spring, a chain, a screw, a nut, a fan wheel, a turbine blade, a pump part, a valve body, an insulator, a connector, a part for an electronic device, a fuel sender unit, an aerosol can, a vehicle storage tank, a coffee brewer part, and a handle for a gun or knife.

18. The polyoxymethylene composition of claim 1, wherein the at least one additive is present in an amount of 0.5 to 3 weight percent based on the total weight of the POM composition.

19. The polyoxymethylene composition of claim 1, wherein the at least one polyoxymethylene polymer in the POM composition has a polymer melt flow rate, which ranges from any decimal value from 0.1 g/10 min. up to and including 50 g/10 min.

* * * * *